US007555973B2

(12) United States Patent
Asahara et al.

(10) Patent No.: US 7,555,973 B2
(45) Date of Patent: *Jul. 7, 2009

(54) AUTOMATIC LATHE

(75) Inventors: Noriyuki Asahara, Nishitokyo (JP); Toru Takahashi, Nagano (JP); Yoshiaki Hirakawa, Nagano (JP); Yosuke Ando, Nishitokyo (JP); Toshiyuki Suzuki, Nishitokyo (JP); Umeo Tsuyusaki, Nagano (JP)

(73) Assignee: Citizen Holdings Co., Ltd., Nishitokyo-Shi, Tokyo (JP)

( * ) Notice: Subject to any disclaimer, the term of this patent is extended or adjusted under 35 U.S.C. 154(b) by 201 days.

This patent is subject to a terminal disclaimer.

(21) Appl. No.: 10/583,691

(22) PCT Filed: Dec. 26, 2003

(86) PCT No.: PCT/JP03/16901

§ 371 (c)(1),
(2), (4) Date: Aug. 8, 2006

(87) PCT Pub. No.: WO2005/065869

PCT Pub. Date: Jul. 21, 2005

(65) Prior Publication Data

US 2007/0227317 A1  Oct. 4, 2007

(51) Int. Cl.
*B23B 3/00* (2006.01)
*B23B 19/02* (2006.01)
(52) U.S. Cl. .................. 82/117; 82/142; 82/152; 82/165
(58) Field of Classification Search .......... 82/117, 82/123, 161, 142, 152, 165, 118; 408/146; 29/27 R, 27 C, 36
See application file for complete search history.

(56) References Cited

U.S. PATENT DOCUMENTS

| 2,273,369 | A | * | 2/1942 | Nielson | 82/164 |
| 3,926,078 | A | * | 12/1975 | Ishizuka et al. | 82/124 |
| 4,180,894 | A | * | 1/1980 | Link | 29/36 |
| 4,382,638 | A | * | 5/1983 | Andoh et al. | 384/472 |
| 4,413,539 | A | * | 11/1983 | Ishizuka et al. | 82/120 |
| 4,998,455 | A | * | 3/1991 | Jauch | 82/127 |
| 5,152,201 | A | * | 10/1992 | Izawa | 82/1.11 |

(Continued)

FOREIGN PATENT DOCUMENTS

JP            58132402 A  *  8/1983

(Continued)

*Primary Examiner*—Boyer D Ashley
*Assistant Examiner*—Sara Addisu
(74) *Attorney, Agent, or Firm*—Manabu Kanesaka

(57) ABSTRACT

An automatic lathe is capable of rapidly and easily switching between machining of a material with a guide bush and machining of the material without the guide bush. The automatic lathe has a guide bush support table, a support table fixing device for fixing the guide bush support table, a guide member rotatably installed on the guide bush support table so as not to move forward and backward, a guide bush detachably fitted to the tip of the guide member, a driving device for rotating the guide bush, a rotation transmission device for transmitting the rotation of the guide member to the spindle, and a spindle moving device for moving the spindle forward and backward within the guide member. A spindle fixing device positions and fixes the spindle at a specified position on the guide bush support table when the guide bush is removed from the guide member.

11 Claims, 10 Drawing Sheets

U.S. PATENT DOCUMENTS

| | | | | |
|---|---|---|---|---|
| 5,924,344 | A * | 7/1999 | Link et al. | 82/129 |
| 6,665,579 | B2 * | 12/2003 | Sasaki et al. | 700/159 |
| 7,249,545 | B2 * | 7/2007 | Shinohara et al. | 82/1.11 |
| 7,464,628 | B2 * | 12/2008 | Shinohara et al. | 82/117 |
| 2007/0151429 | A1 * | 7/2007 | Nakaya et al. | 82/126 |
| 2007/0224007 | A1 * | 9/2007 | Shinohara et al. | 408/146 |

FOREIGN PATENT DOCUMENTS

| | | | |
|---|---|---|---|
| JP | 61086103 A | * | 5/1986 |
| JP | 04-115804 | | 4/1992 |
| JP | 05280532 A | * | 10/1993 |
| JP | 09038802 A | * | 2/1997 |
| JP | 09-225703 | | 9/1997 |
| JP | 2750356 | | 2/1998 |
| JP | 11-010405 | | 1/1999 |

* cited by examiner

AUTOMATIC LATHE

TECHNICAL FIELD

The present invention relates to an automatic lathe having a spindle and a tool post capable of relative movement, and the automatic lathe machines a material gripped by a chuck at the tip of the spindle by use of a tool installed on the tool post.

BACKGROUND ART

In some known machine tools such as a numerically controlled (NC) automatic lathe capable of implementing various kinds of automatic lathe-turning machining (hereinafter generically called an automatic lathe), a guide bush is provided in the vicinity of a position where machining is performed with a tool, and the tip of a long rod-like material (hereinafter referred to as a rod material) gripped by a chuck at the tip of a spindle is supported by the guide bush and thus machined (e.g., refer to Japanese Patent Publication Laid-open No. 4-115804).

In the machining of the rod material using the guide bush, a part to be machined at the tip of the rod material is supported so as not to cause deflection during lathe-turning machining, such that there is an advantage that even an elongated product can be continuously and highly accurately machined from the long rod material.

However, in spite of the advantage described above, the automatic lathe equipped with the guide bush has a problem that there is a gap, which is small, between the guide bush and the rod material, and the rod material moves due to this gap, which makes the automatic lathe unsuitable to machine products requiring more accurate machining.

Furthermore, there is a problem that, due to a condition that the dimension of the rod material be longer than at least a distance between a grip position of the chuck at the forward end of the spindle and a machining position in the vicinity of the guide bush, it is not possible to machine a rod material shorter than this distance. Moreover, there is a problem that if a long rod material is machined, a material between the grip position and the machining position results in a remaining material.

Thus, the automatic lathe equipped with the guide bush has a problem of increased equipment cost and machining cost because its use is limited to the machining of the rod materials having a length equal to or longer than a certain length.

On the other hand, another automatic lathe has been proposed, wherein when highly accurate machining is carried out for a relatively short product or when machining is carried out under a machining condition with a heavy cutting load, a guide bush is suitably removed, thereby making it possible to switch from machining with the guide bush to machining without the guide bush (e.g., refer to Japanese Patent Publication Laid-open No. 9-225703).

However, in the technique described in this document, it is necessary to insert the tip of a spindle into a protection hole placed instead of the guide bush when machining is carried out without the guide bush. Thus, a certain length of the tip of the spindle protrudes from a tool post, but the part protruding from the tool post is not supported. Therefore, the tip of the spindle is in an overhanging state, and its rigidity is reduced. This leads to a problem that the tip of the spindle bends to result in a decreased machining accuracy when machining a relatively short product requiring high machining accuracy which needs to be machined without using the guide bush and when machining is carried out with a heavy cutting load.

Furthermore, a lathe of a type in which a tool post is movable has been proposed, wherein in order to increase an accuracy when machining is carried out with a heavy cutting load, a guide bush having a chuck function is held at the tip of a spindle held on the tool post, and a material feed shaft comprising a chuck is provided within the spindle movably with respect to the spindle (e.g., refer to U.S. Pat. No. 2,750,356).

However, even the technique described in this document can not solve the above-mentioned problem of producing a remaining material. Moreover, there are needed a mechanism to open/close the chuck of the guide bush, and a mechanism to open/close the spindle chuck, so that the configuration of the automatic lathe is complicated and the length of the spindle is increased, leading to another problem that the overall length of a machine is increased.

The present invention has been made in view of the foregoing problems, and is directed to provide an automatic lathe comprising a guide bush which rotates at the same speed as a material. The automatic lathe is capable of easily switching between the machining of the material with the guide bush and the machining of the material without the guide bush. The automatic lathe has a simple and compact configuration in which a spindle is rigidly supported up to its tip or up to the vicinity of the tip to increase mechanical rigidity, such that machining accuracy is not decreased even when the material is machined without using the guide bush. Moreover, the switching operation can be easily performed by a user who is not a person in charge of, for example, a manufacturer of the automatic lathe.

DISCLOSURE OF THE INVENTION

In order to achieve the object of the present invention, an automatic lathe of the present invention has a spindle and a tool post configured to relatively move in a spindle axis line direction, and machines a material gripped by a chuck at the tip of the spindle by use of a tool installed on the tool post, and the automatic lathe comprises: a head stock configured to move forward and backward; the spindle rotatably supported on the head stock and having a through-hole which allows the rod-like material to be inserted therethrough; the tool post equipped with the tool to machine the material gripped by the chuck of the spindle; a guide bush support table disposed on a spindle tip side of the head stock; support table fixing means for positioning and fixing the guide bush support table at a specified position on a bed; a guide member which is rotatably supported on the guide bush support table and which is regulated so as not to move forward and backward with respect to the guide bush support table and in which a through-hole is formed so that the spindle is inserted therein; a guide bush detachably fitted to the tip of the guide member; driving means provided in the guide bush support table to rotate the guide member together with the guide bush; rotation transmission means for transmitting the rotation of the guide member to the spindle; spindle moving means for moving the spindle forward and backward together with the head stock inside the guide member; and spindle fixing means for preventing the spindle from moving forward and backward with respect to the guide bush support table, and positioning and fixing the spindle at a specified position on the guide bush support table when the guide bush is removed from the guide member.

According to this configuration, when machining is carried out using the guide bush, the material is gripped by the chuck of the spindle, and the tip of the material is supported by the guide bush. In this state, predetermined machining is carried out with the tool installed on the tool post while the material is being moved together with the spindle by the spindle moving means. At this point, since the guide bush and spindle are rotated at a synchronized speed by the common control means, scraping and burning are not caused between the guide bush and the material, thereby allowing machining with high-speed rotation.

When the material is machined without using the guide bush, the guide bush is removed from the tip of the guide member, and the spindle is moved within the guide member and positioned at the specified position. Then, the spindle is fixed to the guide bush support table by the spindle fixing means, thereby regulating forward and backward movement within the guide member and fixing the spindle in a state positioned at the specified position. Thus, the spindle can be supported up to its tip by the guide member, thus allowing increased mechanical rigidity of the tip of the spindle and highly accurate machining.

Here, being "capable of relative movement in the spindle axis line direction" includes the following case: a case where the material is machined while the tool installed on the tool post is being moved in a direction to cut the material gripped by the spindle and in the spindle axis line direction; or a case where the tool installed on the tool post is moved only in the cutting direction, and the material is machined while being moved in the spindle axis line direction together with the spindle.

In this case, a guide may be provided to guide the forward and backward movement of the guide bush support table so that the guide bush support table is movable along the guide when the fixing of the guide bush support table by the support table fixing means is cancelled.

According to this configuration, if the guide bush is removed from the guide member to bring the spindle and the guide bush support table into a fixed state, and the fixing of the guide bush support table by the support table fixing means is cancelled, the guide bush support table can be moved together with the spindle. That is, machining can be performed in such a manner that the guide bush support table functions as a moving head stock of the automatic lathe.

The support table fixing means for fixing the guide bush support table on the bed can comprise a positioning member positioned and fixed on the bed, and a bolt coupling the positioning member to the guide bush support table.

Furthermore, a spacer with a specified width may be placed between the positioning member and the guide bush support table so that the position of the guide bush or the tip of the spindle is adjustable when the guide bush is fitted or removed.

The positioning member may be a tool post base which supports the tool post.

In the present invention, the rotation transmission means may be formed as an engaging member which engages with the spindle on the tip and terminal end sides of the guide member.

Thus, the guide member is engaged with the spindle at a plurality of places on the tip and terminal end sides such that the torsion of the spindle can be suppressed.

Furthermore, the rotation transmission means and the spindle fixing means can be configured to have an attachment fitted and fixed to the guide member and the tip of the spindle after the guide bush is removed from the tip of the guide member, an engaging portion formed in an inner peripheral surface of the attachment, and an engaged portion formed in the spindle to be engaged with the engaging portion.

Thus, simply fitting the attachment allows the regulation of the forward and backward movement of the spindle and the positioning and fixing of the spindle as well as the transmission of rotation from the guide member to the spindle.

When the guide bush is removed, the spindle is fixed to the guide bush support table by the spindle fixing means, such that the spindle is coupled to the guide bush support table. There may also be provided coupling means for directly coupling the head stock to the guide bush support table.

In this case, a thermal expansion absorption member which absorbs a dimensional change of the spindle due to thermal expansion can be provided in at least one place of the spindle.

The thermal expansion absorption member comprises regulating means for regulating the spindle so that the spindle does not to move forward and backward with respect to the head stock when the guide bush is fitted, and regulation canceling means for canceling the regulation of the spindle by the regulating means when the guide bush is removed.

According to this configuration, when the guide bush is removed and the head stock is coupled to the guide bush support table by the coupling means, the regulation preventing the spindle from the forward and backward movement is cancelled, thereby allowing the spindle to move with respect to the head stock.

In addition, after the guide bush has been removed, the spindle is fixed by the spindle fixing means so as not to move forward and backward with respect to the guide bush support table, and the guide bush support table is directly coupled to the head stock via the coupling means, so that the spindle usually does not freely move forward and backward with respect to the head stock. If the spindle causes the thermal expansion, the spindle moves with respect to the head stock so as to absorb the dimensional change due to the thermal expansion.

Furthermore, the regulating means comprises an engaging member which engages with the spindle in the front and rear on the spindle axis line, and a fitting member which fits the engaging member to the head stock so that the engaging member does not rotate with respect to the head stock and so that the engaging member has a gap of preset dimensions in the spindle axis line direction without separating from the head stock when the regulation of the spindle is cancelled by the regulation canceling means. The regulation canceling means can be a fitting member which fits and fixes the engaging member onto the head stock.

According to this configuration, if the fitting member is simply removed from the engaging member, the forward and backward movement of the engaging member and the spindle is enabled.

The configuration of the present invention is as described above, so that the guide bush is easily fitted/removed, and one automatic lathe can be switched to rapidly adapt to the machining with the guide bush and the machining without the guide bush, thereby allowing reductions in equipment cost and machining cost. Further, when the guide bush is used, even an elongated product can be continuously machined with relatively high accuracy. When the guide bush is not used, the spindle is positioned and fixed at the specified position on the guide bush support table, or the guide member and the tip of the spindle are fixed by the attachment, thereby allowing a rigid spindle configuration. Therefore, a relatively short product can be highly accurately machined, and the machining can be carried out with a heavy cutting load.

BRIEF DESCRIPTION OF THE DRAWINGS

FIG. 1 concerns one embodiment of an automatic lathe of the present invention, wherein

FIG. 8 concerns another embodiment of the present invention, wherein

BEST MODE FOR CARRYING OUT THE INVENTION

One preferred embodiment of the present invention will hereinafter be described in detail with reference to the drawings.

Figure 1A:
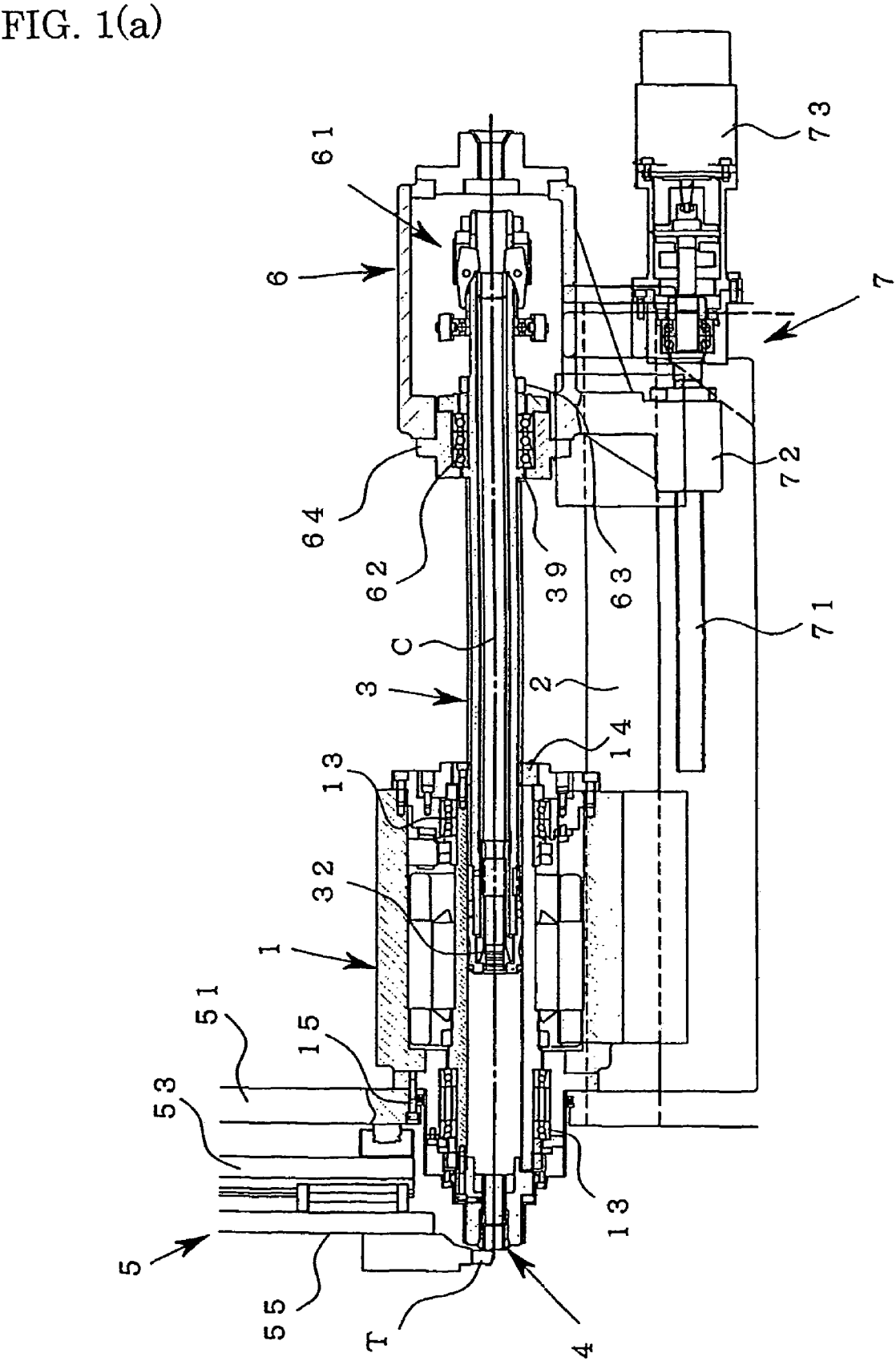
FIG. 1(a) is a sectional view explaining the configuration of essential parts including a guide bush support table and a head stock.
Figure 1B:
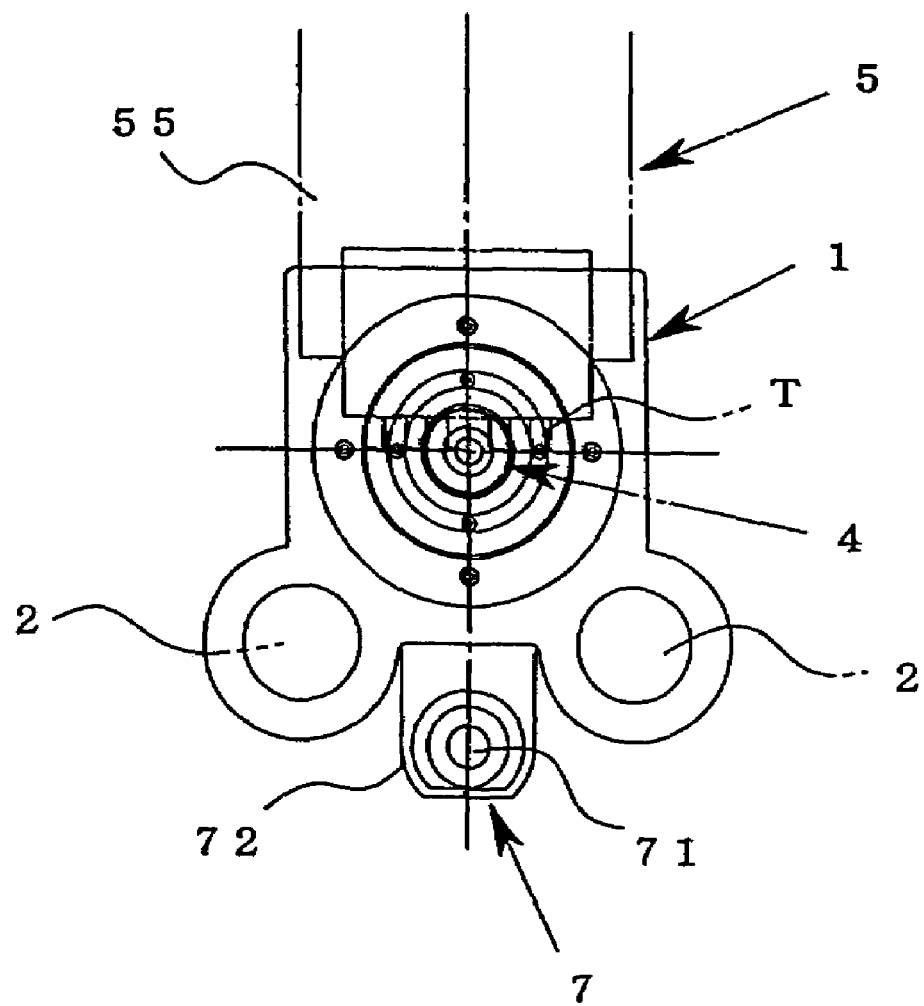
FIG. 1(b) is a front view of the head stock in FIG. 1(a)
Figure 1B:
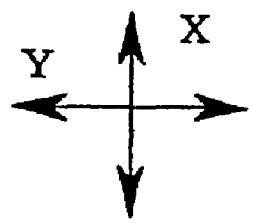

FIG. 1 concerns one embodiment of an automatic lathe of the present invention, wherein FIG. 1(a) is a sectional view explaining the configuration of essential parts including a guide bush support table and a head stock, and FIG. 1(b) is a front view of the guide bush support table in FIG. 1(a).

It is to be noted that in the following description, "front", when referred to, indicates a front end side of a spindle provided with a chuck which grips a rod material, that is, the left side in FIG. 1(a), while "rear", when referred to, indicates a rear end side of the spindle, that is, the right side in FIG. 1(a).

As shown in FIG. 1(a), the automatic lathe in this embodiment has: a slide guide 2 provided on an unshown bed; a head stock 6 which freely moves in forward and backward directions on the slide guide 2; a guide bush support table 1 disposed in front of the head stock 6 and capable of moving in the forward and backward directions on the slide. guide 2; a spindle 3 rotatably supported on the head stock 6 and provided so as to freely move in forward and backward directions with respect to the guide bush support table 1; a guide bush 4 rotatably provided on the guide bush support table 1 in front of the spindle 3 and on the same axis line C as the spindle 3; a tool post 5 equipped with a plurality of tools T to machine the rod material protruding from the guide bush 4; a collet open/close member 61 which is provided inside the head stock 6 and which opens/closes a collet 32 fitted to the front end of the spindle 3; and a spindle moving member 7 which moves the spindle 3 together with the head stock 6 in the forward and backward directions.

It is to be noted that, as shown in FIG. 1(b), the slide guide 2 is disposed in parallel with the axis line C on both sides under the guide bush support table 1 and the head stock 6 in the present embodiment, and the head stock 6 and the guide bush support table 1 can smoothly move forward and backward by the spindle moving member 7 provided under the slide guide 2, under the guidance of the slide guide 2.

Figure 2:
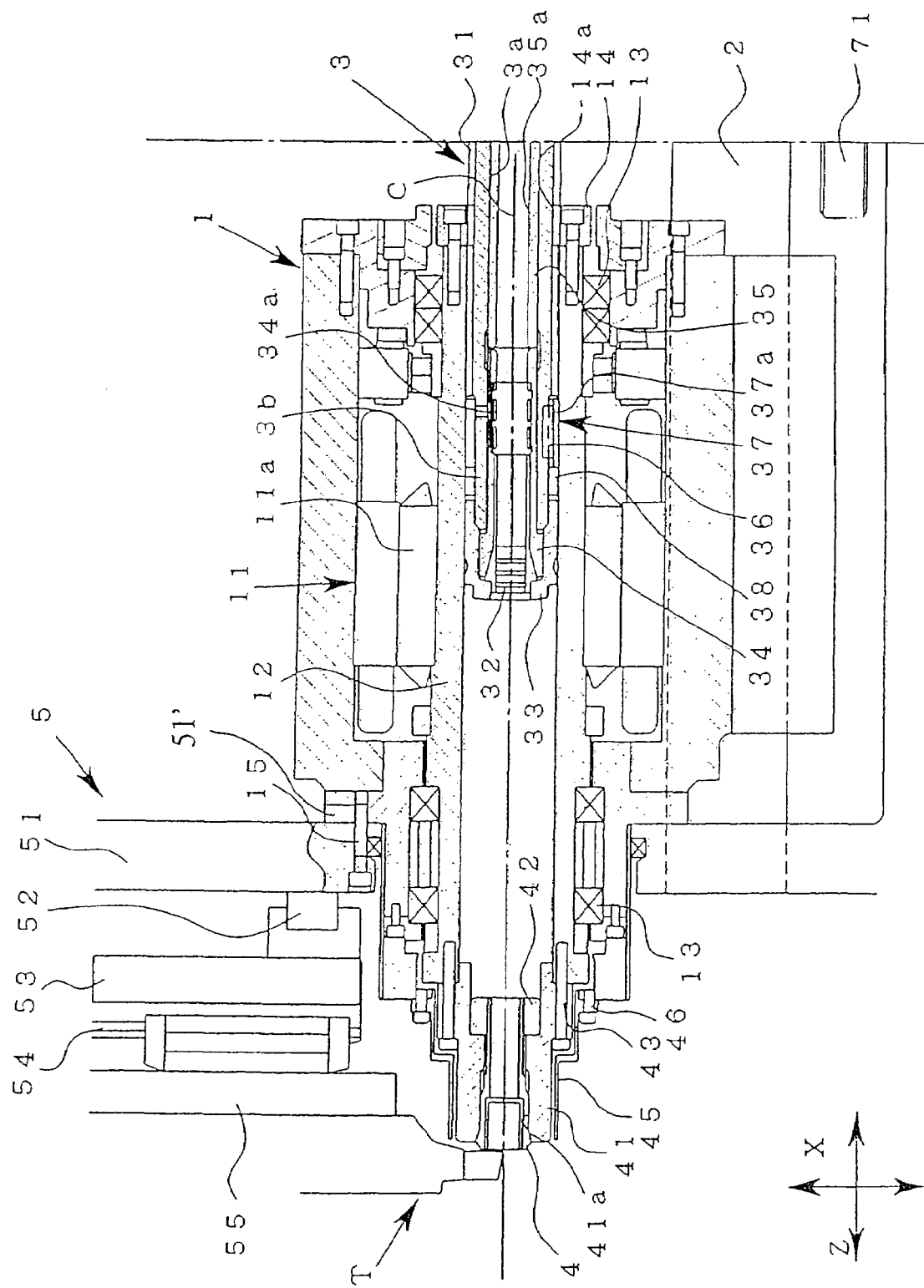
FIG. 2 is a view in which a part corresponding to the guide bush support table in FIG. 1 is enlarged.

FIG. 2 is a view in which a part corresponding to the head stock in FIG. 1(a) is enlarged.

A built-in motor 11 is incorporated in the guide bush support table 1, and a guide sleeve-12 which rotates on the axis line C is fitted to a rotor 11a of the motor 11. The guide sleeve 12 is rotatably supported by bearings 13, 13 on front end and rear end sides of the guide bush support table 1.

Furthermore, the guide bush 4 is fitted to the front end of the guide sleeve 12 via a cylindrical attachment 41 which is guide bush fitting means. This attachment 41 has a large diameter hole 41a which receives a main body part of the guide bush 4, and a small diameter hole 41b which is formed through the bottom of the large diameter hole 41a and through which the body of the guide bush 4 is inserted.

The main body part of the guide bush 4 is inserted into the large diameter hole 41a of the attachment 41, and a nut 42 is screwed into the rear end of the body inserted through the small diameter hole 41b, thus fitting the guide bush 4 to the attachment 41. Then, the attachment 41 fitted with the guide bush 4 is detachably fitted to the front end of the guide sleeve 12 by a plurality of bolts 43. Further, a cylindrical cover 45 is fitted to the outside of the attachment 41 to prevent foreign matter such as cutting chips from entering the guide bush support table 1 from a gap between the guide sleeve 12 and the attachment 41. The cover 45 is fitted to a front end surface of the guide bush support table 1 by a plurality of bolts 46.

The tool post 5 has a tool post base (i.e., positioning member) 51 fixed to the unshown bed, a saddle 53 which freely moves forward and backward in a Y direction (direction rectangular to the surface of the drawing) with respect to the tool post base 51 under the guidance of a guide 52 of the tool post base 51, and a tool fitting member 55 which freely moves forward and backward in an X direction (vertical direction in the drawing) with respect to the saddle 53 under the guidance of a guide 54 provided in the saddle 53. The plurality of tools T is arranged in a comb-teeth manner and fitted to the tool fitting member 55. Then, the tool fitting member 55 is moved in the Y direction to determine the predetermined tool T to be used for machining from the plurality of tools T, and the cutting edge of the tool T is located in the vicinity of the guide bush 4 to machine the rod material.

It is to be noted that the guide bush support table 1 is fitted to the tool post base 51 by a plurality of bolts 15, and when the rod material is machined using the guide bush 4, the guide bush support table 1 is in a fixed state so as not to move on the slide guide 2.

Furthermore, as in this embodiment, when the guide bush support table 1 is fitted to the tool post base 51 to regulate its movement, the bolts 15 to be used are preferably formed of a material having low heat transmitting properties such as ceramics so that the heat is not transmitted from the guide bush support table 1 to the tool post base 51. Moreover, a spacer 51' formed of a material having low heat transmitting properties is preferably placed at a contact portion between the guide bush support table 1 and the tool post base 51.

In the spindle 3, a through-hole 3a is formed concentrically with the axis line C, and on its outer peripheral surface, a spline 31 is formed in the same direction as the axis line C. On the other hand, an annular disk 14 is fitted to the rear end of the guide sleeve 12, and a spline groove 14a formed in an inner peripheral surface of the disk 14 engages with the spline 31 of the spindle 3. The rotation of the guide sleeve 12 is transmitted to the spindle 3 via the spline groove 14a and the spline 31.

The front end portion of the spindle 3 is formed to have a diameter smaller than the diameter of other portions, and formed as a small diameter portion 3b having a thread groove formed in an outer peripheral surface thereof. Further, the collet 32 which grips the rod material is fitted to the small diameter portion 3b. The collet 32 is contained in a cylindrical cap nut 33 together with a collet sleeve 34 in which a cam to open/close the collet 32 is formed. This cap nut 33 is screwed to the small diameter portion 3b to fit the collet 32 to the front end of the spindle 3.

One or a plurality of key grooves is formed in the same direction as the axis line C in the outer peripheral surface of the small diameter portion 3b located closer to the rear side than the collet 32, and a key 36 is fitted into this key groove. This key 36 functions as rotation transmission means for engaging the guide sleeve 12 with the spindle 3 to transmit the rotation of the guide sleeve 12 to the spindle 3 when the rod material is machined without using the guide bush 4.

Therefore, when the rod material is machined using the guide bush 4, the key 36 is contained inside a sleeve 37 externally fitted to the small diameter portion 3b of the spindle 3 so that the key 36 does not function. A key groove 37a is formed in an inner peripheral surface of the sleeve 37, and when the sleeve 37 is externally fitted to the small diameter portion 3b of the spindle 3, the key groove 37a engages with the key 36. Further, this sleeve 37 is pressed against a stepped portion formed at the rear end of the small diameter portion 3b by a nut 38 screwed in the small diameter portion 3b so that the sleeve 37 is fixed at a specified position in the small diameter portion 3b.

It is to be noted that the outside diameters of the cap nut 33 and the sleeve 37 described above are preferably formed to coincide with the inside diameter of the guide sleeve 12 so that the front end of the spindle 3 may be supported in the guide sleeve 12.

Within a draw bar 35 which opens/closes the collet 32, a through-hole 35a through which the bar material can be inserted is formed on the same axis line as the axis line C. Moreover, the front end of the draw bar 35 butts against the rear end of the collet sleeve 34, and if the draw bar 35 moves forward to push the collet sleeve 34 forward, the cam formed in an inner peripheral surface at the front end of the collet sleeve 34 closes the collet 32. A return spring 34a is provided inside the collet sleeve 34. When the draw bar 35 moves backward, the collet sleeve 34 is pressed back by the return spring 34a, thereby opening the collet 32. The forward and backward movement of the draw bar 35 is performed by the collet open/close member 61 provided inside the head stock 6 on the rear end side of the spindle 3.

As shown in FIG. 1, a bearing 62 is fitted to the front end of the head stock 6 by a bearing holder 64. The rear end of the spindle 3 is rotatably supported by this bearing 62.

Figure 3:
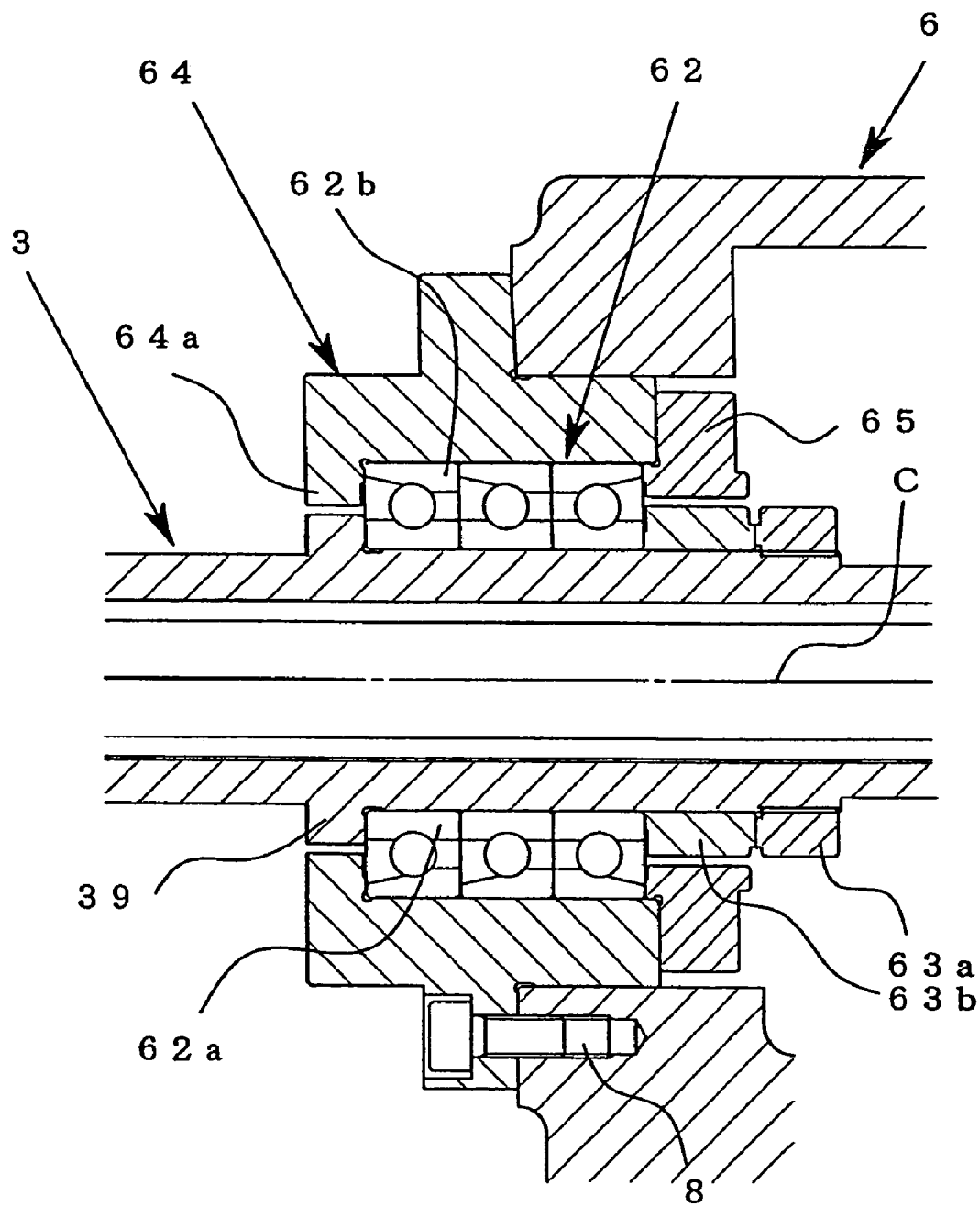
FIG. 3 is an enlarged view of a part where a bearing 62 is provided at the front end of the head stock.

FIG. 3 is an enlarged view of a part where the bearing 62 is provided at the front end of the head stock.

A radially-outwardly projecting flange 39 is formed in an outer peripheral surface of the spindle 3 located on the front end side of the bearing holder 64, and an inner ring 62a of the bearing 62 is held from the front and rear by the flange 39, a nut 63a screwed in from the rear end of the spindle 3, and a sleeve 63b. Further, a radially-inwardly projecting protrusion 64a is formed at the front end of the bearing holder 64, and a ring-shaped holding member 65 is fitted to the rear end of the bearing holder 64. Moreover, an outer ring 62b of the bearing 62 is held from the front and rear by the protrusion 64a and the holding member 65.

In this manner, if the bearing holder 64 is fixed to the head stock 6 by a bolt 8, the movement of the spindle 3 in the axis line C direction with respect to the head stock 6 is regulated.

The head stock 6 freely moves forward and backward in the same direction as the axis line C under the guidance of the slide guide 2, and the spindle moving member 7 which moves the spindle 3 forward and backward together with the head stock 6 is provided under the head stock 6.

The spindle moving member 7 has a screw shaft 71 extending in the same direction as the axis line C, a motor 73 which rotates the screw shaft 71, and a nut 72 screwed in the screw shaft 71. The head stock 6 is coupled to the nut 72, and moved forward and backward in the same direction as the axis line C together with the nut 72 by the rotation of the screw shaft 71 caused by the driving of the motor 73.

In the automatic lathe having the configuration described above, the rod material is supplied from the rear end of the spindle 3 through the through-hole 3a. Then, the draw bar 35 is moved forward while the front end of the rod material is protruding from the guide bush 4 at a predetermined length, and the collet 32 is closed to grip the rod material. Subsequently, the rod material is rotated together with the spindle 3, and the rod material is fed by predetermined length together with the spindle 3 in the same direction (Z direction) as the axis line C by the spindle moving member 7, thus performing predetermined machining with the tool T.

Next, there will be described with reference to FIGS. 4 and 5 a switching procedure of removing the guide bush 4 from the automatic lathe having the configuration described above and switching to an automatic lathe which does not comprise the guide bush 4.

Figure 4A:
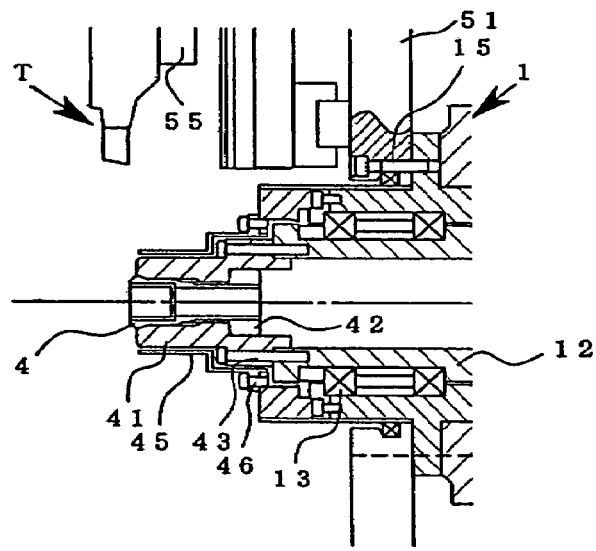
FIG. 4 is a diagram explaining a switching procedure of removing the guide bush from the automatic lathe in FIGS. 1 and 2 and switching to an automatic lathe which does not comprise a guide bush.

First, as shown in FIG. 4(a), the tool fitting member 55 is moved in the X direction to move the tool T away from the guide bush 4 to a position where the switching operation is not disturbed.

Figure 4B:
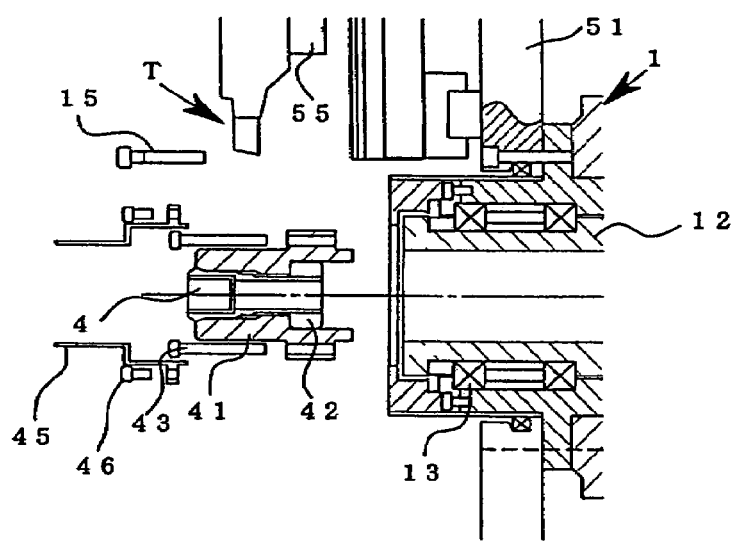

Then, as shown in FIG. 4(b), the plurality of bolts 46 is removed to remove the cover 45 from the guide bush support table 1, and the plurality of bolts 43 is removed to remove the attachment 41 and the guide bush 4 from the guide sleeve 12. Moreover, the plurality of bolts 15 coupling the guide bush support table 1 to the tool post base 51 is removed to cancel the fixing of the guide bush support table 1, thus allowing the guide bush support table 1 to freely move on the slide guide 2.

Furthermore, the motor 73 of the spindle moving member 7 is driven to move the spindle 3 forward together with the head stock 6, thus causing the collet 32 to project from the front end of the guide sleeve 12. In this state, as shown in FIG. 4(c), the cap nut 33 fixing the collet 32 to the front end of the spindle 3, and the sleeve 37 holding the nut 38 and the key 36 are removed from the front end of the spindle 3 in order.

Figure 5A:
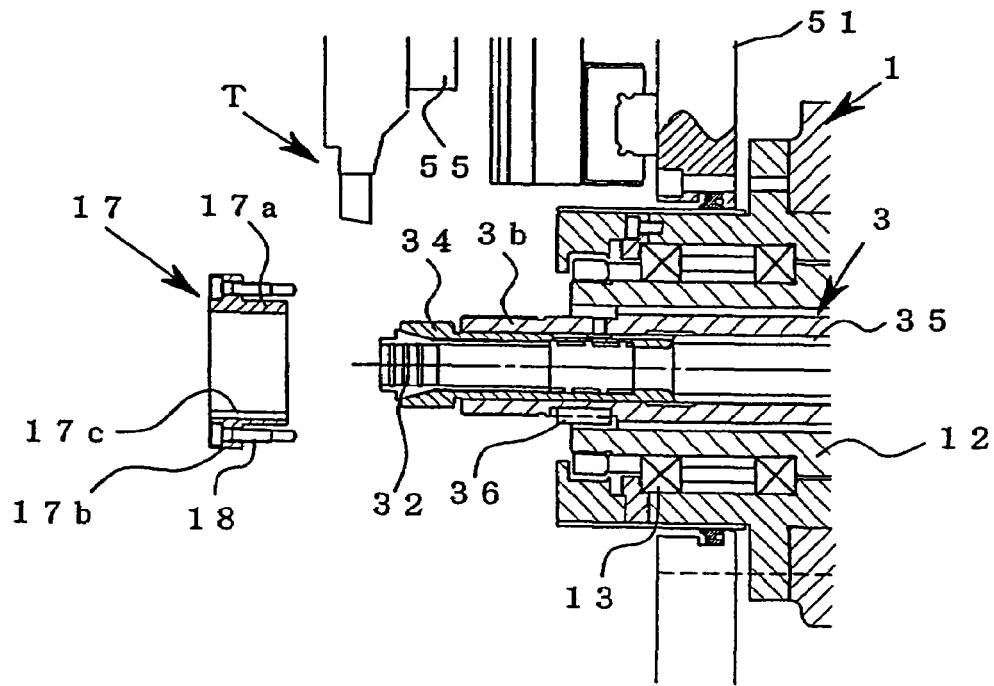
FIG. 5 is a diagram explaining a switching procedure continuing from the procedure in FIG. 4.

Next, as shown in FIG. 5(a), there is prepared an attachment 17 to support the front end of the spindle 3 and fix the spindle 3 so as not to move forward and backward with respect to the guide bush support table 1 after the switching.

This attachment 17 has an inside diameter identical with the outside diameter of the small diameter portion 3b of the spindle 3, and has a cylindrical body 17a with an outside diameter identical with the inside diameter of the guide sleeve 12, and a flange 17b formed at the front end of the body 17a. Further, a key groove 17c which engages with the key 36 is formed in an inner peripheral surface of the attachment 17. In the flange 17b, a plurality of bolt holes is formed in accordance with the positions of screw holes formed at the front end of the guide sleeve 12 in order to fit the guide bush 4. The attachment 17 is fitted to the front end of the guide sleeve 12 by a plurality of bolts 18 inserted through the bolt holes.

Figure 4C:
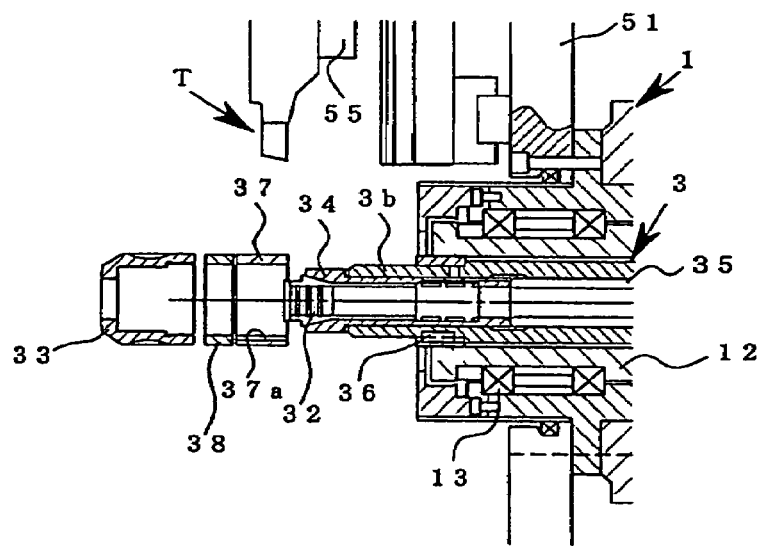
Figure 5B:
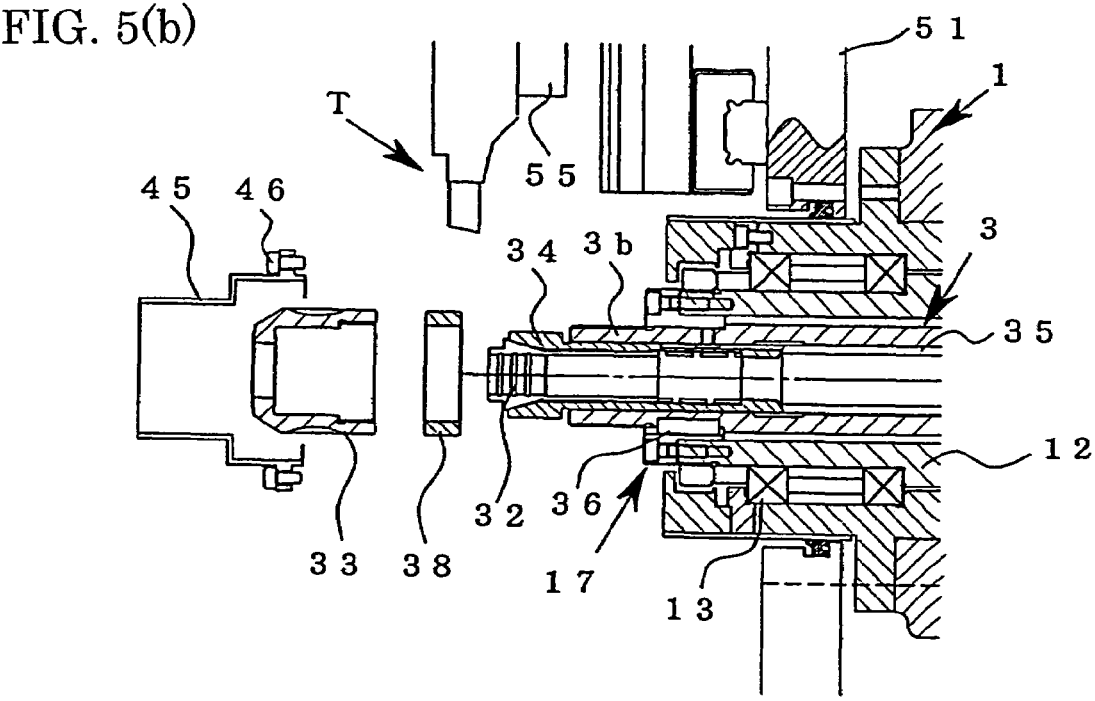

Next, as shown in FIG. 5(b), the nut 38 and the cap nut 33 removed from the small diameter portion 3b in accordance with the procedure shown in FIG. 4(c) are sequentially screwed to the small diameter portion 3b. Then, the nut 38 is fastened to the small diameter portion 3b, and the attachment 17 is clamped by the stepped portion formed at the rear end of the small diameter portion 3b and the nut 38. This regulates the forward and backward movement of the spindle 3 with respect to the guide bush support table 1. That is, in this embodiment, the nut 38, the attachment 17 and the key 36 constitute spindle fixing means for positioning and fixing the spindle 3 at a specified position on the guide bush support table 1.

This completes the switching.

Figure 6:
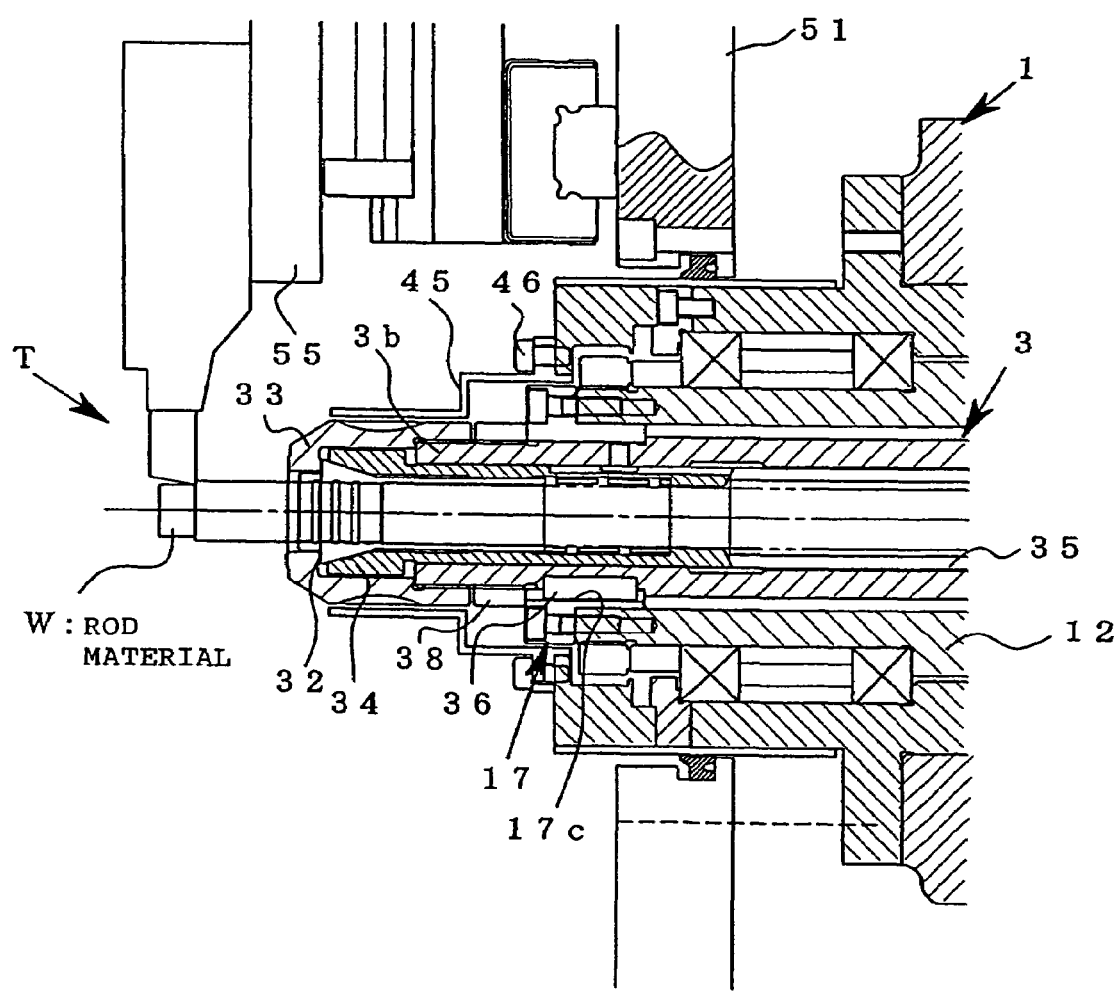
FIG. 6 is an enlarged view of the front end part of the spindle after the switching.

FIG. 6 is a partial enlarged view of the front end of the spindle after the switching has been carried out in the procedure described above, and FIG. 7 is a sectional view showing the essential parts of the automatic lathe after the switching.

As shown in FIG. 6, the rear end of the attachment 17 attached to the guide sleeve 12 so as to be externally fitted to the small diameter portion 3*b* contacts the stepped portion at the rear end of the small diameter portion 3*b* to regulate the forward movement of the spindle 3, while the nut 38 screwed to the small diameter portion 3*b* contacts the front end of the attachment 17 to regulate the backward movement of the spindle 3. Moreover, the key groove 17*c* of the attachment 17 engages with the key 36 so that the rotation of the guide sleeve 12 is transmitted to the spindle 3.

Thus, in this embodiment, the rotation is transmitted from the guide sleeve 12 to the spindle 3 at two places on the front end side and rear end side of the guide sleeve 12, and there is therefore an advantage that the spindle 3 is not easily twisted when the rod material is machined.

Figure 7:
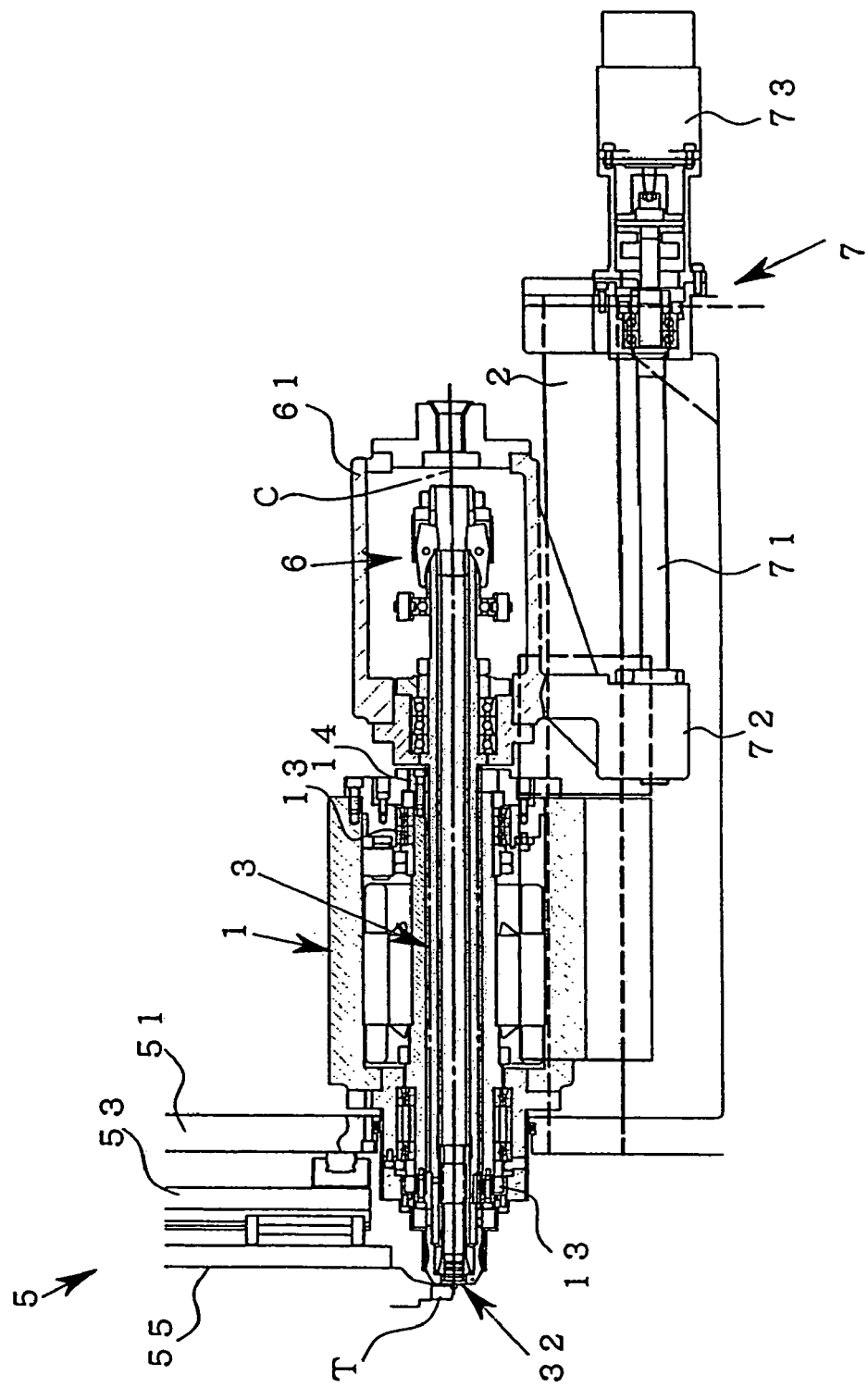
FIG. 7 is a sectional view showing the essential parts including the head stock of the automatic lathe after the switching.

Furthermore, the guide bush support table 1 can move forward and backward in the same direction as the axis line C under the guidance of the slide guide 2 after the switching, but because the guide bush support table 1 is coupled to the spindle 3 via the attachment 17 and the guide sleeve 12, the guide bush support table 1, the head stock 6 and the spindle 3 integrally move forward and backward in the same direction as the axis line C owing to the spindle moving member 7 which moves the spindle 3 forward and backward. That is, after the switching, the guide bush support table 1 and the head stock 6 form a movable head stock, as shown in FIG. 7.

Then, as shown in FIG. 6, a rod material W is gripped by the collet 32 in a state protruding from the front end of the spindle 3 at a predetermined length, and the spindle 3 is fed to the tool T together with the guide bush support table 1 in the Z direction, thus machining the rod material W.

Figure 8A:
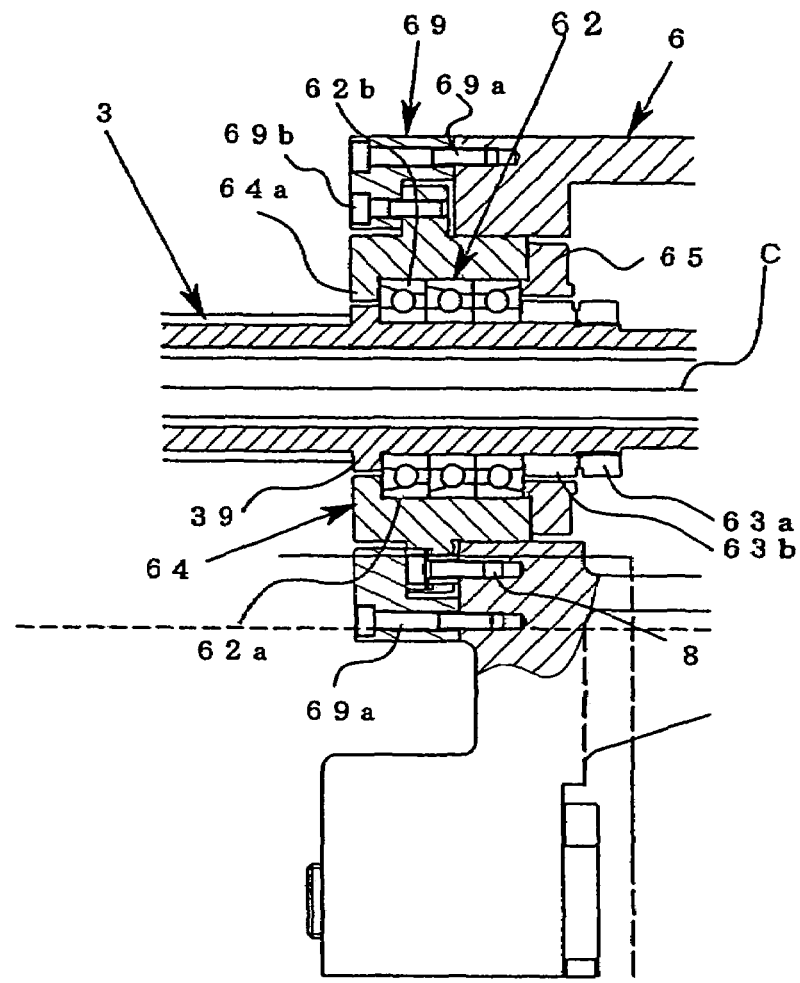
FIG. 8(a) is an enlarged sectional view of the front end part of the spindle.
Figure 8B:
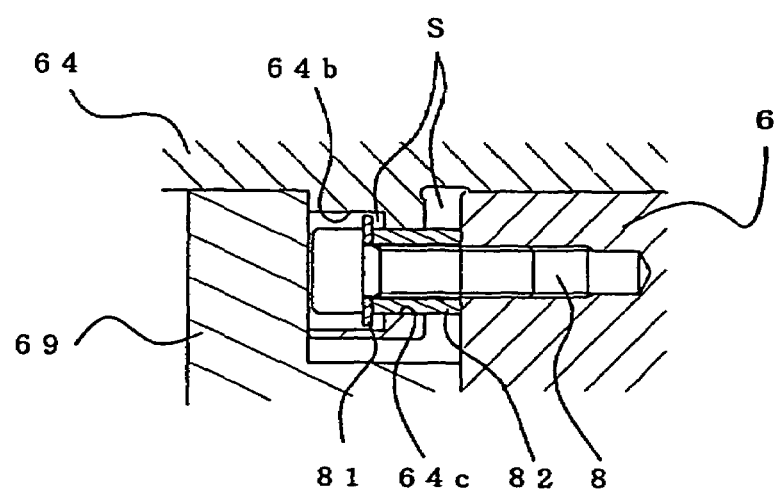
FIG. 8(b) is a sectional view in which essential parts in FIG. 8(a) are further enlarged.
Figure 9:
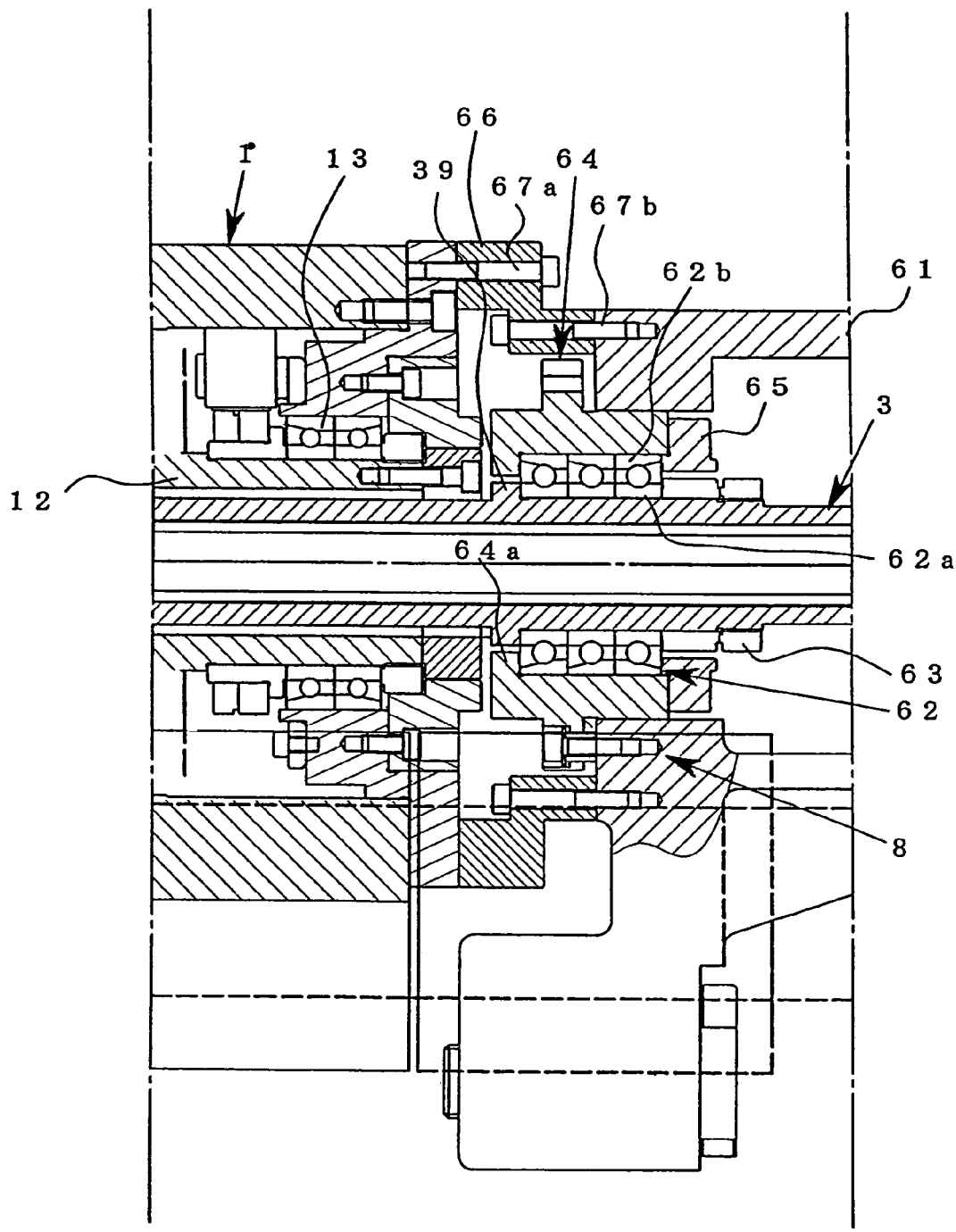
FIG. 9 is an enlarged sectional view showing how the guide bush support table is coupled to the head stock by a coupling member.

FIGS. 8 and 9 concern another embodiment of the present invention. FIG. 8(*a*) is an enlarged sectional view of the front end part of the spindle, FIG. 8(*b*) is a sectional view in which essential parts in FIG. 8(*a*) are further enlarged, and FIG. 9 is an enlarged sectional view showing how the guide bush support table is coupled to the head stock by a coupling member.

It is to be noted that in FIGS. 8 and 9, the same signs are given to the same parts and portions as those in the previous embodiment, and they are not described in detail.

In the embodiment described above, the head stock 6 is coupled to the guide bush support table 1 via the attachment 17 and the guide sleeve 12, but in this embodiment, another coupling means (coupling member 66) is used to couple the guide bush support table 1 to the head stock 6, as shown in FIG. 9. Thus, there is an advantage that the use of another coupling means makes it possible to reduce the load on the spindle 3 when the spindle 3 is moved together with the guide bush support table 1 and the head stock 6.

As shown in FIG. 8(*a*), the bearing holder 64 holding the bearing 62 is fitted to a front end surface of the head stock 6 by at least one bolt 8 so as not to drop from the head stock 6 and so as not to rotate with respect to the head stock 6.

As shown in FIG. 8(*b*), the bolt 8 is equipped with a washer 81 and a sleeve 82 in a fitted state. The bolt 8, the washer 81 and the sleeve 82 are inserted in a bolt hole 64*b* formed in a flange portion of the bearing holder 64, and screwed into a screw hole in the front end surface of the head stock 6 through a through-hole 64*c* formed at the bottom of the bolt hole 64*b*. Since the length of the sleeve 82 (the length in the axis line C direction) is formed larger than the thickness of the bottom of the bolt hole 64*b*, a small amount of space S is formed between the flange portion of the bearing holder 64 and the front end surface of the head stock 6 and between the washer 81 and the bottom of the bolt hole 64*b* when the bolt 8 is tightened. The dimensions of the space S should be larger than a maximum value of a thermal expansion amount of the spindle 3 at the front end of the head stock 6. In this embodiment, the space S forms a thermal expansion absorption member which absorbs a dimensional change due to the thermal expansion of the spindle 3. Further, in this embodiment, the bolt 8 and the sleeve 82 form a space between the bearing holder 64 and the head stock 6, and also form a fitting member which prevents the bearing holder 64 from rotating with respect to the head stock.

Furthermore, as shown in FIG. 8(*a*), a halved or trisected bearing fixing member 69 is annually disposed around the bearing holder 64, and fitted to the front end surface of the head stock 6 by a bolt 69*a* in a state engaged with the bearing holder 64. Further, the bearing holder 64 is coupled to the bearing fixing member 69 by a plurality of bolts 69*b*. Thus, the bearing holder 64 is fixed to the head stock 6 via the bearing fixing member 69. Since the spindle 3 and the bearing holder 64 are regulated so as not move with respect to each other as previously described, the bearing holder 64 is fixed to the head stock 6 via the bearing fixing member 69 such that the forward and backward movement of the spindle 3 with respect to the head stock 6 is also regulated. That is, in this embodiment, the bearing holder 64 forms an engaging member of regulating means for engaging with the spindle 3 to regulate the forward and backward movement of the spindle 3 with respect to the head stock 6.

After the guide bush 4 is removed, the guide bush support table 1 is coupled to the head stock 6 by the coupling member 66, as shown in FIG. 9. The procedure of coupling the guide bush support table 1 to the head stock 6 by the coupling member 66 is as follows.

Before the procedure of coupling the spindle 3 to the guide bush support table 1 described in the previous embodiment, the head stock 6 is moved backward from the guide bush support table 1 to secure a sufficient space between the head stock 6 and the guide bush support table 1. Then, the bolt 69*a* is removed to remove, from the front end surface of the head stock 6, the bearing fixing member 69 fixing the bearing holder 64 to the head stock 6. Subsequently, the coupling member 66 is disposed on the circumference of the front end surface of the head stock 6 around the axis line C, and then fitted to the front end surface of the head stock 6 by a bolt 67*b*.

Then, after the procedure described referring to FIG. 4(*b*) is carried out, the guide bush support table 1 or the head stock 6 is moved in a direction to approach each other to bring a rear end surface of the guide bush support table 1 into contact with the coupling member 66. Then, the bolt 67*a* is tightened to couple the guide bush support table 1 to the head stock 6.

In this case, if the bearing fixing member 69 is removed from the head stock 6, the fixing of the bearing holder 64 to the head stock 3 in the axis line C direction is cancelled, but the spindle 3 is fitted to the guide bush support table 1 so as not to move forward and backward. Therefore, after the head stock 6 is coupled to the guide bush support table 1 by the coupling member 66, the spindle 3 and the bearing holder 64 do not freely move forward and backward with respect to the head stock 6 even if the bearing fixing member 69 is removed.

If the spindle 3 expands due to the heat of the rotor 11a of the motor 11, the bearing holder 64 moves within the range of the space S due to the thermal expansion and absorbs the thermal expansion of the spindle 3.

This embodiment has an advantage that it is not at all necessary for an operator to remove or loosen the bolt 8 fitting the bearing holder 64 to the front end surface of the head stock 6 during the switching, and that the switching operation can be easily and rapidly performed by anyone who is not a skilled operator or a person in charge of a manufacturer that has manufactured and sold the automatic lathe. Moreover, the bearing holder 65 does not separate from the head stock 6 owing to the bolt 8, such that the displacement of the core of the spindle 3 due to the separation of the bearing holder 65 from the head stock 6 is avoided and the safety of the operator can be secured.

While the preferred embodiments of the present invention have been described, the present invention is not at all limited by the embodiments described above.

For example, the spindle-moving-type automatic lathe has been described above by way of example wherein the head stock 6 moves together with the guide bush support table 1 after the switching, but when there is provided a tool post movable in the Z direction, the present invention can also be applied to a spindle-fixed-type automatic lathe wherein the head stock 6 and the guide bush support table 1 are fixed onto the bed. In this case, when the switching is performed, a driving system of the spindle moving member 7 should be separated from the control system of the automatic lathe without removing the bolts 15 coupling the guide bush support table 1 to the tool post base 51.

Furthermore, a spacer 51' with a predetermined width is placed between the tool post base 51 and the front end surface of the guide bush support table 1, and this spacer 51' is removed from the guide bush support table 1, for example, when the guide bush 4 is fitted, thereby allowing adjustment of the position of the guide bush 4 or the front end of the spindle 3 before and after the switching.

INDUSTRIAL APPLICABILITY

The present invention can be applied to a spindle-moving-type automatic lathe and a spindle-fixed-type automatic lathe, and can also be applied to a numerically controlled automatic lathe which performs, in accordance with a program, feeding and stopping of a rod material, determining and positioning of a tool, machining of the rod material with the tool, and parting of a machined product.

Furthermore, the present invention is not limited to an automatic lathe of a type which supplies a long rod material from a rod material supply device disposed in the rear of the automatic lathe, but the present invention can also be applied to an automatic lathe of a type which supplies a relatively short rod-like material to a collet at the front end of a spindle by use of, for example, a robot hand.

Still further, the present invention is not limited to a built-in type automatic lathe incorporating a motor in a guide bush support table, but the present invention can also be applied to an automatic lathe of a type in which a motor is provided outside a guide bush support table and the driving force of this motor is transmitted to a spindle by a driving force transmission mechanism such as a belt or pulley.

The invention claimed is:

1. An automatic lathe which has a tool post and a spindle configured to relatively move in a spindle axis line direction and which machines a material gripped by a chuck at a tip of the spindle by a tool installed on the tool post, comprising:

a head stock configured to move forward and backward;
the spindle rotatably supported on the head stock and having a through-hole which allows a rod-like material to be inserted therethrough;
the tool post equipped with the tool to machine the material gripped by the chuck of the spindle;
a guide bush support table disposed closer to a tip side of the spindle than the head stock;
support table fixing means for positioning and fixing the guide bush support table at a specified position on a bed;
a guide member which is rotatably supported on the guide bush support table and which is regulated so as not to move forward and backward with respect to the guide bush support table and in which a throughhole is formed so that the spindle is inserted therein;
a guide bush detachably fitted to a tip of the guide member;
driving means provided in the guide bush support table to rotate the guide member together with the guide bush;
rotation transmission means for transmitting rotation of the guide member to the spindle;
spindle moving means for moving the spindle forward and backward together with the head stock inside the guide member; and
spindle fixing means for preventing the spindle from moving forward and backward with respect to the guide bush support table, and positioning and fixing the spindle at a specified position on the guide bush support table when the guide bush is removed from the guide member.

2. The automatic lathe according to claim 1, wherein a guide is provided to guide the forward and backward movement of the guide bush support table so that the guide bush support table is movable along the guide when fixing of the guide bush support table by the support table fixing means is cancelled, and wherein when the guide bush is removed to machine the material without using the guide bush, the material gripped by the chuck of the spindle is machined while the head stock and the guide bush support table are being integrally moved forward and backward.

3. The automatic lathe according to claim 1, wherein the support table fixing means has a positioning member positioned and fixed on the bed, and a bolt coupling the positioning member to the guide bush support table.

4. The automatic lathe according to claim 3, wherein a spacer with a specified width is placed between the positioning member and the guide bush support table so that the position of the guide bush or the tip of the spindle is adjustable when the guide bush is fitted or removed.

5. The automatic lathe according to claim 3, wherein the positioning member is a tool post base which supports the tool post.

6. The automatic lathe according to claim 1, wherein the rotation transmission means is an engaging member which engages with the spindle on the tip and terminal end sides of the guide member.

7. The automatic lathe according to claim 1, wherein the rotation transmission means and the spindle fixing means have an attachment fitted and fixed to the guide member and the tip of the spindle after the guide bush is removed from the tip of the guide member, an engaging portion formed in an inner peripheral surface of the attachment, and an engaged portion formed in the spindle to be engaged with the engaging portion.

8. An automatic lathe which has a tool post and a spindle configured to relatively move in a spindle axis line direction and which machines a material gripped by a chuck at a tip of the spindle by a tool installed on the tool post, comprising:

a head stock configured to move forward and backward;

the spindle rotatably supported on the head stock and having a through-hole which allows a rod-like material to be inserted therethrough;

the tool post equipped with the tool to machine the material gripped by the chuck of the spindle;

a guide bush support table disposed closer to a tip side of the spindle than the head stock;

support table fixing means for positioning and fixing the guide bush support table at a specified position on a bed;

a guide member which is rotatably supported on the guide bush support table and which is regulated so as not to move forward and backward with respect to the guide bush support table and in which a through-hole is formed so that the spindle is inserted therein;

a guide bush detachably fitted to a tip of the guide member;

driving means provided in the guide bush support table to rotate the guide member together with the guide bush;

rotation transmission means for transmitting rotation of the guide member to the spindle;

spindle moving means for moving the spindle forward and backward together with the head stock inside the guide member; and spindle fixing means for preventing the spindle from moving forward and backward with respect to the guide bush support table, and positioning and fixing the spindle at a specified position on the guide bush support table when the guide bush is removed from the guide member, wherein the head stock is coupled to the guide bush support table by coupling means when the guide bush is removed from the guide member.

9. The automatic lathe according to claim 8, wherein a thermal expansion absorption member which absorbs a dimensional change of the spindle due to thermal expansion is provided in at least one place of the spindle.

10. The automatic lathe according to claim 9, wherein the thermal expansion absorption member comprises regulating means for regulating the spindle so that the spindle does not to move forward and backward with respect to the head stock when the guide bush is fitted, and regulation canceling means for canceling a regulation of the spindle by the regulating means when the guide bush is removed.

11. The automatic lathe according to claim 10, wherein the regulating means comprises an engaging member which engages with the spindle in front and rear on the spindle axis line, and a fitting member which fits the engaging member to the head stock so that the engaging member does not rotate with respect to the head stock and so that the engaging member has a gap of preset dimensions in the spindle axis line direction without separating from the head stock when the regulation of the spindle is cancelled by the regulation canceling means, and the regulation canceling means is a fitting member which fits and fixes the engaging member onto the head stock.

* * * * *